INVENTOR.
George H. Logemann

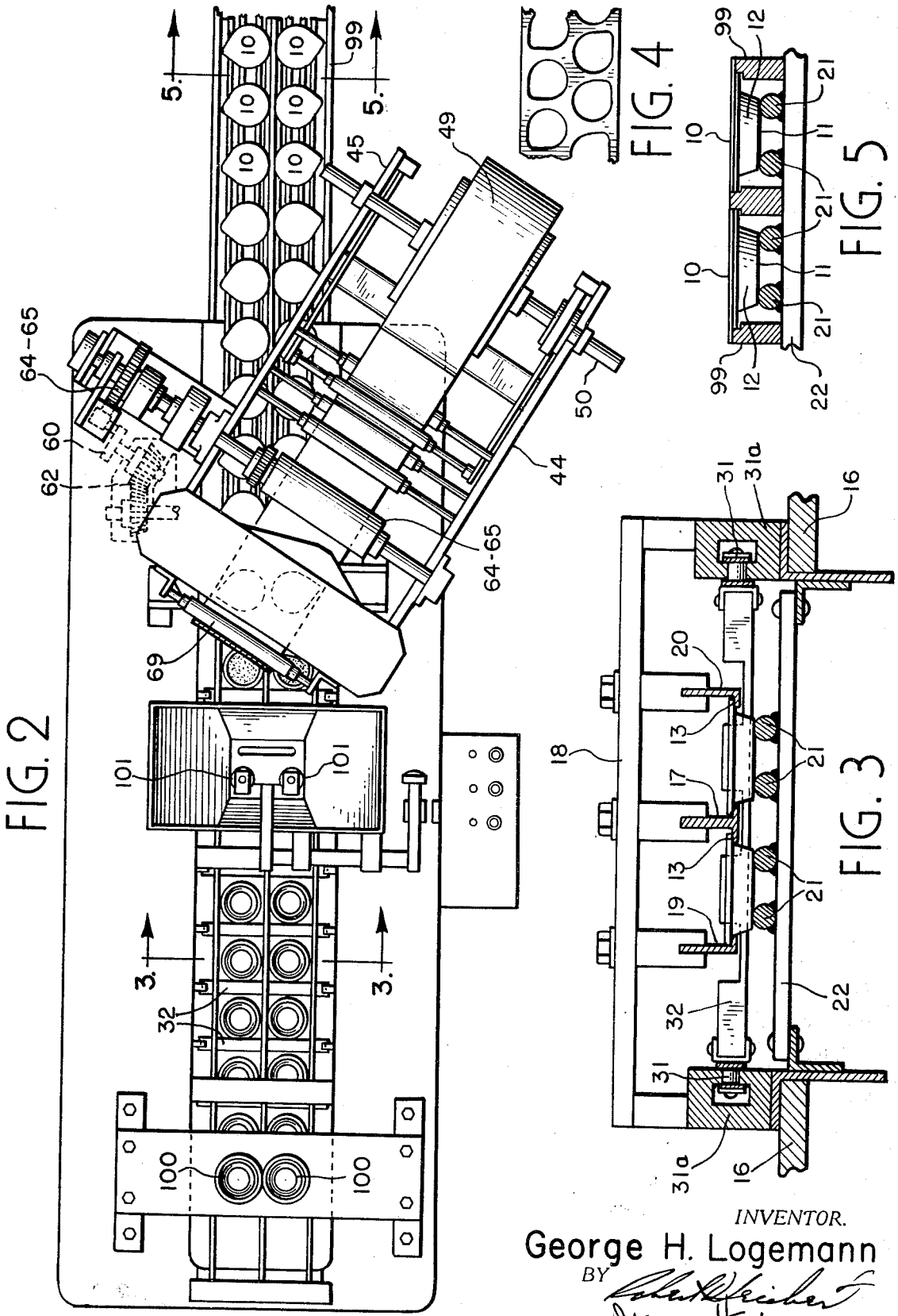

May 5, 1970  G. H. LOGEMANN  3,509,682
METHOD AND APPARATUS FOR THE ASSEMBLING OF HEAT
SEALABLE COVERS TO FILLED CONTAINERS
Filed April 3, 1968  5 Sheets-Sheet 3
FIG. 6
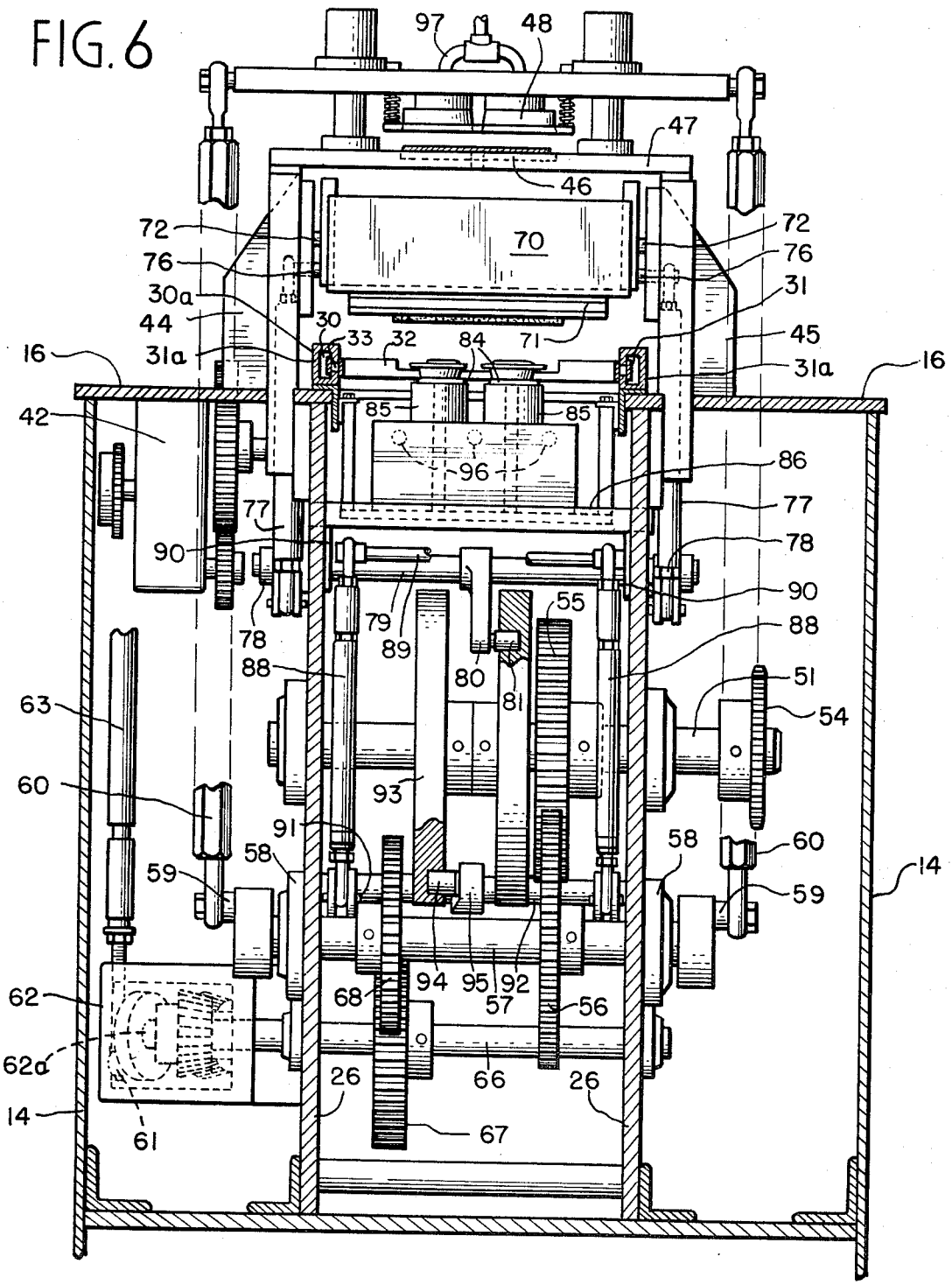
FIG. 7
INVENTOR.
George H. Logemann
BY
Attorney

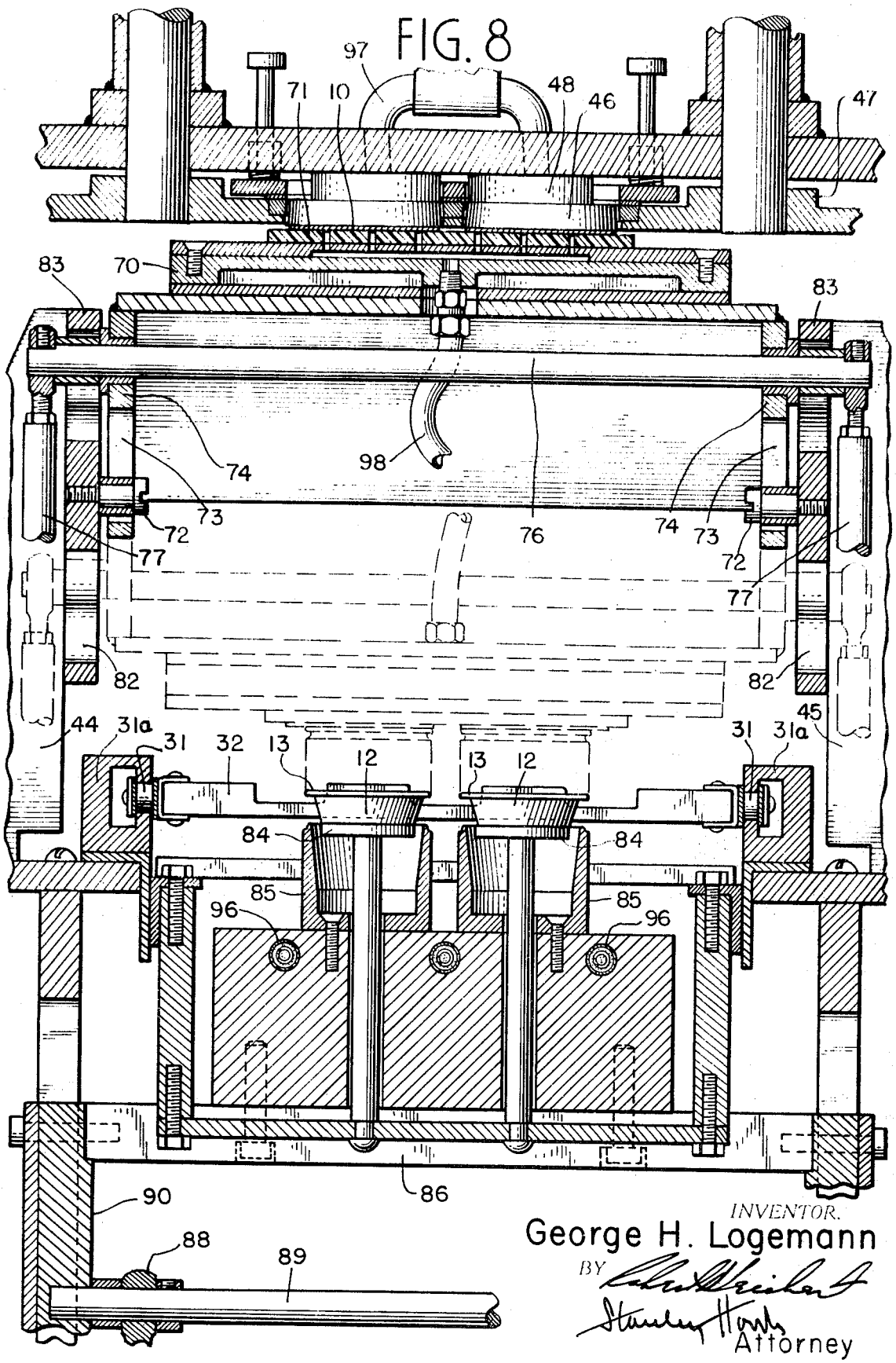

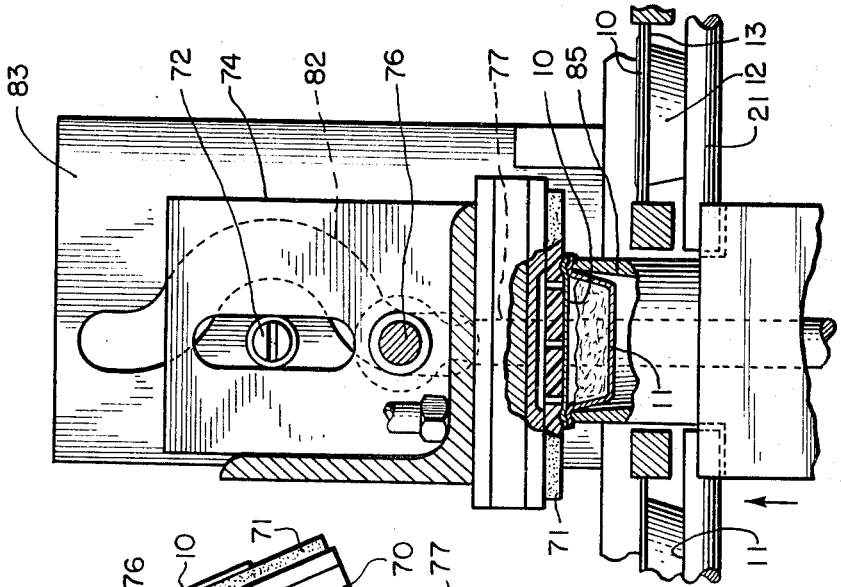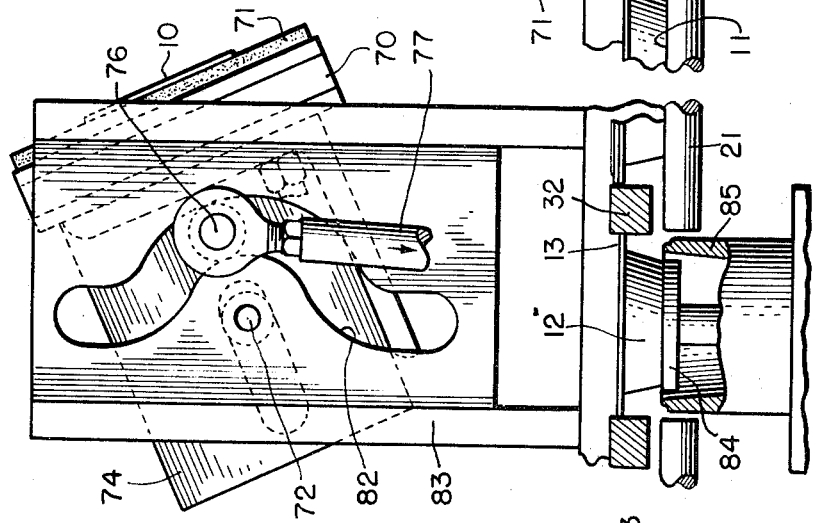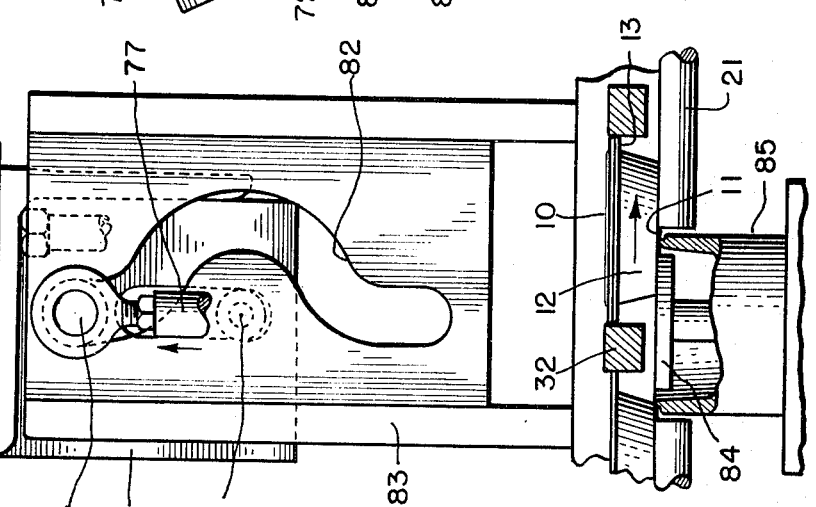

United States Patent Office 3,509,682
Patented May 5, 1970

3,509,682
METHOD AND APPARATUS FOR THE ASSEMBLING OF HEAT SEALABLE COVERS TO FILLED CONTAINERS
George H. Logemann, Mundelein, Ill., assignor to Ekco Products, Inc., Wheeling, Ill., a corporation of Illinois
Filed Apr. 3, 1968, Ser. No. 718,490
Int. Cl. B65b *7/28;* B67b *3/04*
U.S. Cl. 53—39                                10 Claims

ABSTRACT OF THE DISCLOSURE

This disclosure relates to a packaging apparatus wherein foil laminated paper cover stock is fed from coil stock to a blanking die assembly mounted at a horizontal angle of 32 degrees to the line of travel of a two lane conveyor which carries containers through the filler station to the closure station in straight line intermittent motion. The blanking die blanks 2 covers at a time from the cover stock and a transfer head rotates to withdraw the covers from the blanking die assembly and to positively place and seal the covers simultaneously while the head has straight line vertical motion in the direction of the containers. Application of heat for sealing the cover is confined to the rim of the container.

---

This invention relates to a packaging apparatus and more particularly new and improved mechanism for the automatic assembly of a cover of thin heat sealable material with a filled container having a rim with which the cover has accurate registration and sealed engagement.

It is an object of this invention to provide a packaging apparatus of the type indicated wherein filled containers are intermittently advanced in a continuous procession to a heat sealing station in timed relation with automatic operation of a blanking unit which severs a cover from a continuous strip of cover stock and a transfer unit which transfers the severed cover from the blanking unit to the heat sealing station.

A still further object of the present invention is to provide a novel packaging machine having the features and characteristics set forth which is of relatively simplified construction, operates automatically with a minimum amount of attention by the operator and is highly efficient and effective in operation and use.

These and other objects of the present invention and the various features and details of the operation and construction thereof are hereinafter more fully set forth and described with reference to the accompanying drawings, in which:

FIG. 2 is a plan view.

FIG. 3 is an enlarged vertical section taken along line 3—3 of FIG. 2.

FIG. 4 is a view of the cover stock material as it appears after undergoing action of the cover blanking mechanism.

FIG. 5 is a vertical section taken along line 5—5 of FIG. 2.

FIG. 6 is a vertical section taken along line 6—6 of FIG. 1.

FIG. 7 is a detailed view of a connecting rod forming part of the drive mechanism.

FIG. 8 is an enlarged fragmentary vertical section illustrating details of the transfer unit and the heat sealing unit.

FIGS. 9, 10 and 11 are enlarged fragmentary side elevational views, partly in section, showing the cover blanking punch and die unit, the cover transfer unit and the sealing unit in different moved positions while in process of completing the formation of a cover and the application of the same in sealed engagement with the rim of a filled container while at the sealing station.

Figure 1:
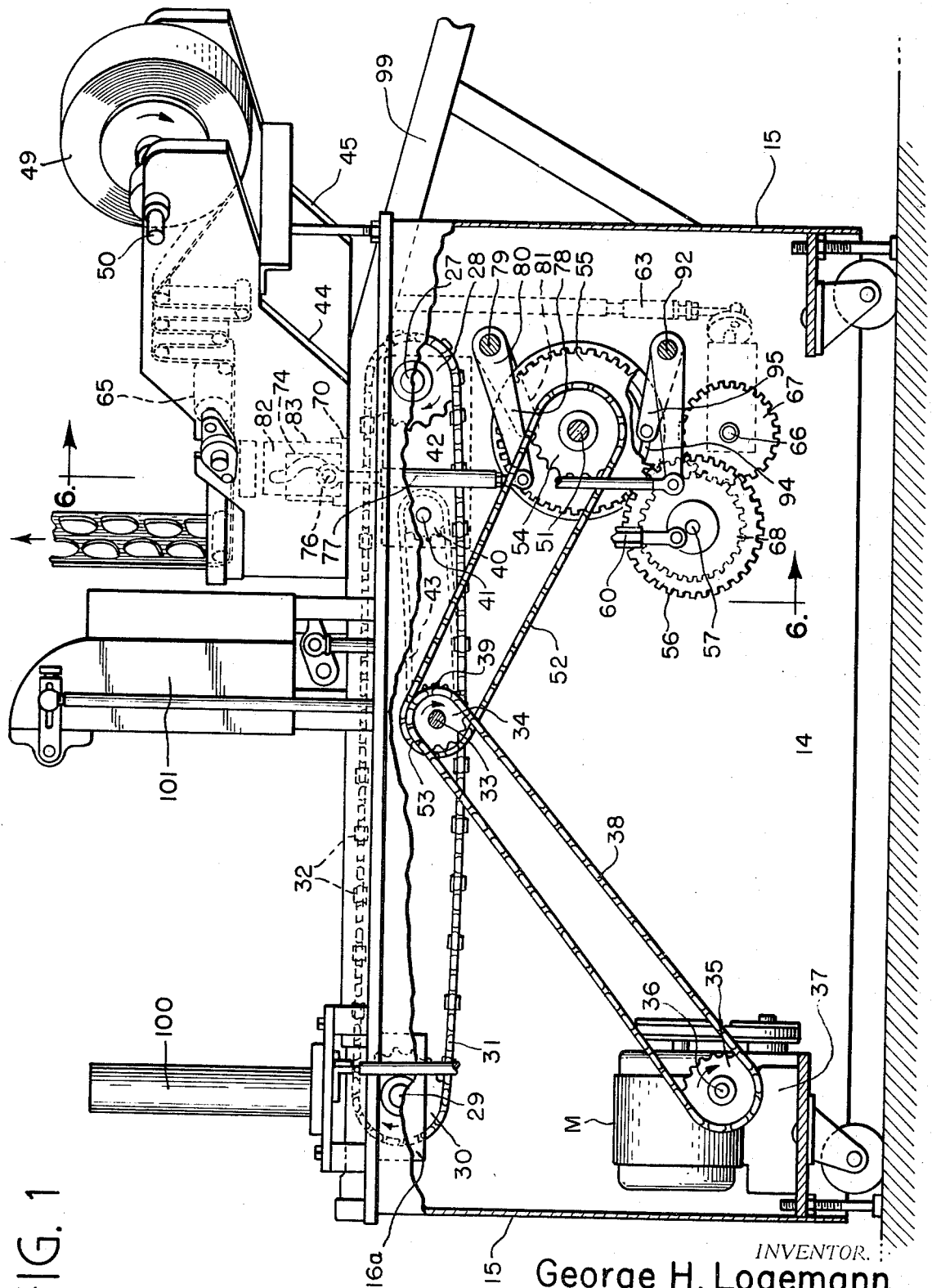
FIG. 1 is a side elevational view of a packaging apparatus in accordance with the present invention with portions removed to expose the drive mechanism.

As shown in FIGS. 2 and 3 of the drawings, a container and cover assembly exemplifying a closed package as produced in the operation of a machine incorporating the features of this invention, reference numeral 10 represents a cover of foil laminated paper cover stock having a thermo-sealing film on one of the faces of said cover, and a metallic foil container having a bottom wall 11, a continuous side wall 12 rising upwardly and outwardly from the perimeter of said bottom wall 11 is provided with a flange 13 formed integrally with and extending outwardly from the upper limits of said side wall 12 which defines a lip with which the film surface of the cover 10 has sealed engagement.

The machine includes a box-like housing having a pair of opposed upright side walls 14 joined in spaced apart parallel relation by upright end walls 15. The housing supports a pair of like frame members 16 in horizontally aligned spaced apart relation so as to expose a guideway between said frame members extending lengthwise of the housing side walls 14. As shown in FIG. 3, the guideway includes a guide rail 17 mounted centrally of and parallel to the frame members 16 via overhead supporting brackets 18 spanning the distance between and secured to members 16 to which the guide rail 17 is adjustably secured and a pair of outer guide rails 19 and 20 likewise adjustably secured to the supporting brackets 18 in spaced parallel flanking relation to the guide rail 17. These guide rails provide horizontally aligned ledges against which the side wall of a container may ride while the rim of the container is in overhead relation to the ledges thus defined by the rails. Each container of a column of containers while confined between guide rails 17 and 19 has its bottom wall 11 in downward engagement with a pair of spaced parallel rods 21 fixed to cross bars 22 so as to position said rods in horizontally aligned relation centrally of the area between and offset downwardly of the rails 17 and 19 while containers of a second column of containers during confinement between guide rails 17 and 20 have the walls 11 thereof in downward engagement with a similar pair of rods 21 fixed to the cross bars 25 occupying horizontally aligned positions centrally of the area between and offset downwardly of guide rails 17 and 20. While the apparatus as shown provides for the simultaneous handling of a succession of containers arranged in two columns, it will, of course, be apparent that this arrangement may be varied to provide for a single column or more than two columns, as desired.

As shown in FIGS. 1 and 2, a pair of upright frame members 26 secured to and extending downwardly from edges of the top frame members 16 which face the guideway, provides support for a shaft 27 which carries a pair of sprocket wheels 28. A shaft 29 which carries a second pair of sprocket wheels 30 is supported on the top frame members 16 via a pair of brackets 16a secured to and extending downwardly from the top frame members 16. The sprocket wheels drive chains 31 to form an orbital conveyor system which straddles the area occupied by the guide rails 17, 19 and 20 and extend parallel thereto. Pusher bars 32 secured by pivot connection 33 to the chains 31 drive containers thus supported on the rods 21 while confined between the guide rails so as to propel the container from left to right as viewed in FIG. 2. The upper horizontal flight of the chains 31 ride in troughs 31a so as to maintain the pusher bars 32 in a fixed line of horizontal travel while in overhead relation to the rods 21. A shaft 33 supported on the frame members 26 via brackets 33a carries a sprocket 34 having driving connection with the sprocket 35 on the shaft 36 of gear unit 37 associated with electric motor M via a chain 38 joining sprockets 34 and 35. A second sprocket 39 carried by shaft 33 has driving connection with a sprocket 40 on the shaft 41 of an intermittent drive mechanism 42 via a chain 43 joining sprockets 39 and 40. Rotation of shaft 27 which carries sprocket wheels 29 is controlled by the intermittent drive mechanism 42 whereby the pusher bars are actuated intermittently to advance the containers at selected intervals of time to insure correct feed in accordance with the intermittent operation of the other mechanism such as the container supply unit, the container filling unit, the cover cutting punch and die unit and the cover transfer and sealing units.

The space between a pair of walls 44 and 45 secured to and extending upwardly from the frame members 19 in spaced apart relation straddling a vertical plane at 32 degrees variance to the line of travel of the conveyor system is occupied by a punch and die unit including a female die 46 having fixed support on an overhead platform 47 bridging the distance between the walls 44 and 45 and a punch member 48 mounted to reciprocate between an upper position spaced above the die 46 and a lower position below the shearing edges of the die member 46. When the punch member 48 is in its upper position, the die member 46 and the surface of the punch 48 opposite thereto forms a passageway occupied by a web or strip of cover forming stock 49 supplied to said punch and die unit from a frictionally held roll of such cover stock carried by a shaft 50 supported in spaced parallel relation to the path of movement of the punch member. Operation of the punch 48 between its upper and lower positions is obtained through drive means including a drive shaft 57 which is driven by a chain 52 linking a sprocket 53 on shaft 33 with a sprocket 54 on shaft 51. A drive gear 55 fixed on shaft 51 meshes with a gear 56 secured to a shaft 57 supported in bearings 58 attached to the frame members 26. A crank 59 at each of the opposed ends of shaft 57 operates a connecting rod 60 which controls movement of the punch member between upper and lower positions and as shown in FIG. 6, the crank when in upper position holds the punch member in an elevated position relative to the female die 46.

As the crank 59 is operated to move the punch member 48 from a lower position within female die 46 to its elevated position as shown in FIG. 6, a crank 61 associated with a shaft 62a of a miter gear unit 62 in conjunction with a connecting rod 63 acts on a rack 64 meshing with a pinion 65 to turn a pair of feed rollers 65 through a selected angle so as to advance the strip of cover stock material into the area between the punch and female die a distance corresponding to the area next available for forming a cover blank. The miter gear unit 62 is driven by means of a gear 67 on a shaft 66 which meshes with a gear 68 on the shaft 57. As the web or strip of cover stock is thus advanced, rollers 69 are rotated intermittently in timed relation with rotation of the feed rollers 64 and 65 to withdraw the waste strip from the area within the punch and die unit on return of the punch to its upper position as shown in FIG. 1.

Reference numeral 70 generally designates the head of a cover transfer unit. The head is provided with a cover engaging front face or pad 71 of suitable resilient material not deteriorated by heat such as silicone and a back-up layer of synthetic resinous material such as Teflon impregnated fiber glass. A pair of pivot pins 72 occupying horizontally aligned positions within slots 73 formed in a pair of spaced apart parallel arms 74 extending rearwardly from the head 70 cooperate to define an axis parallel to the path of the punch 48 about which the head 70 may be turned and shifted from a first position wherein the pad 71 faces the punch 48 and a second position wherein the pad 71 faces the line of travel of containers as defined by the guideway. The head 70 is carried on a shaft 76 which is moved up and down by a connecting rod 77 pivotally secured to opposite ends of shaft 76 under control of a crank 78 secured to a rock shaft 79 and a lever 80 secured to the shaft 79 which is rocked up and down by a cam 81 which is driven by sprocket 54 which drives shaft 51 to which the cam 81 is fixed. In connection with such up and down movement of the head 70, guide slots 82 provided in brackets 83 fixed to the walls 44 and 45 and facing the area occupied by the head 70 act on the shaft 76 to cause the head 70 to rock about the pivot pins 72 while the head 70 is moved from an upper position as shown in FIG. 9 to a lower position as shown in FIG. 11. During such movement the head is shifted to the right by an arcuate section of the guide slots 82 concentric with pivot pins 72 so as to cause the head to undergo reverse swinging movement as shown in FIG. 10.

As the containers are successively delivered by the intermittently operable conveyor mechanism to the area directly below the position occupied by the head 70, the container is deposited on a stationary support 84 which has an upper surface horizontally coplanar with the corresponding surface of the rods 24 and 26. A sealing collar 85 having an outside peripheral contour and dimension matching that of the punch 48 is supported on a platform 86 which has vertically guided sliding movement below the guideway toward and away from the area occupied by the support 84. During upward movement of the collar 85 the underside of the flange 13 on the container on the support 84 is engaged by the upper rim 87 of the collar and elevated so as to press the flange 13 against the head 70 while the latter is in its lower position. Such movement of the collar 85 in timed relation with the movement of the head 70 to its lower position is accomplished through operation of a pair of connecting rods 88 which are linked respectively to a shaft 89 fixed to the legs 90 of platform 86 and to arm 91 of cranks fixed to opposite ends of a shaft 92 which is rocked between positions effective to raise and lower the platform 86 via a cam 93 on shaft 51 and a follower 94 on arm 95 of a third crank fixed to the center portion of shaft 92. Electrical heating means disposed internally of the collar, and generally designated by reference numeral 96 conducts heat to the surface of the flange of the container while engaged with the rim of the collar 85 so as to heat the portion of the container which receives the cover material while the rim of the container and the cover engaged therewith is pressed against the pad 71 of the transfer head.

Tubes 97 through which vacuum is sequentially applied to and released from the punch 48 as well as a tube 98 through which vacuum is sequentially applied to and released from the transfer head 70 are controlled by an electrically actuated solenoid valve (not shown) that has a timing cam (not shown) associated with drive shaft 51. As each cover blank is severed from the strip of cover stock by the punch 48 in cooperation with the female die 46, vacuum applied to the punch 48 is operable to hold the cover blank 10 against the lower perforated face of the punch pending movement of the transfer head to its upper position wherein the resilient pad 71 engages the surface of the cover blank facing the head 70. Simultaneously with such engagement of the pad 71 with the cover blank 10, vacuum is automatically released from the punch 48 and vacuum is applied to the head 70 to allow withdrawal of the cover blank from the lower face of the punch and to retain the cover blank against the pad 71 of the head 70 pending movement of the head 70 from its upper to its lower position. The vacuum system is operated to release the cover blank 10 substantially at the point that the cover blank 10 is engaged by the container flange 13.

The guide slots 82, it should be noted, have vertically extending end portions with which the chordal limits of the arcuate section have vertical alignment as shown in FIGS. 9, 10 and 11. Accordingly the shaft 76 has a straight line vertical motion while the head 70 approaches or leaves its uppermost position facing the punch 48 or while the head approaches or leaves its lowermost position facing the sealing collar 85. Such straight line motion causes any "peaking" product in the container to be pressed and packed into the container rather than smeared over the rim of the container incident to placement of the cover 10 on the rim of the container thereby assuring a proper sealed engagement between the rim of the container and the surface of the cover 10 facing said rim.

The area above the loading or left hand end of the guideway defined by the rails 20, 22 and 23 is occupied by a magazine 100 from the lower end of which empty containers are delivered and deposited on the rods 24 and 25 in timed relation with the arrival of a pusher bar 32 in readiness to advance such containers toward the area containing the sealing unit. While enroute from the outlet end of magazine 100 to the cover sealing area, the empty containers pass through a station defined by an overhead dispensing unit 101 which is operated in timed relation with movement of the pusher bars 32 and containers engaged thereby to discharge into each of the containers in vertical alignment therewith a measured quantity of material which forms the contents of the completed container and cover assembly. Since the specific details of construction of the container dispensing unit 100 and material dispensing or filling unit 101 form no part of this invention, further description is deemed unnecessary.

OPERATION

For convenience in describing the operation, it will be assumed that the various moving parts of the machine are initially in the position shown in FIGS. 1 and 6, wherein the support 84 is occupied by a container and the sealing collar 85 is in its lower position, the transfer head 70 having its cover engaging pad 71 facing the container and the punch 48 is in elevated position.

The drive shaft 51 is rotated by the motor M via sprockets 35, 34 and 54 and chains 38 and 52 to drive shaft 66 via gear 55, gears 56 and 68 on shaft 57 and gear 67 on shaft 66 which acts through the miter gear unit 62 and crank 61 and connecting rod 63 to drive the feed rolls 65 to advance the web or strip 49 of cover stock a distance corresponding to the size of the cover to be cut therefrom by the punch 48 in cooperation with die 46.

The intermittent drive of the pusher bars 32, acting through the sprocket 40 which is linked by chain 43 to a sprocket 39 on shaft 33 driven by sprocket 34, is operative to advance a container on the support 84 to the discharge chute 99 and to simultaneously move a succeeding container to a position on the support 84. During this movement of the containers, the cam 93 on shaft 51 which cooperates with a follower on crank 95 fixed to shaft 57 produces no elevating movement of the heating collar 85.

As the shaft 57 continues to turn via gear 56 on shaft 57 and gear 55 on shaft 51, cranks 59 acting through connecting rods 60 cause the punch 48 to be lowered to cut the cover 10 from the web of cover stock 49. Simultaneously cam 81 on shaft 51 acting via a follower on crank 80 fixed to rock shaft 79 is operative through cranks 78 to move the head 70 from upper to intermediate and then to lower positions as shown in FIGS. 9, 10 and 11 while crank 95 on shaft 57 is rocked and thereby operative to elevate arm 91 and connecting rod 88 causing the collar 85 to lift the container associated therewith into sealing engagement with a cover 10 engaged by the pad 71 of transfer unit 70 as shown in FIG. 11.

As the sealing operation is completed and the sealing collar is retracted to its lower position as shown in full lines in FIG. 8, the intermittent drive mechanism 42 is operable to actuate the pusher bar in nearest trailing relation to the container so as to deliver the completed container and cover assembly to a discharge chute 99.

What is claimed is:

1. A packaging apparatus for closing and sealing a package of the type comprising a container having its contents exposed at a top opening bordered by an outwardly projecting flange defining a rim, and a cover of heat activated sealant on one face thereof for sealing engagement with the rim of said container, said machine including an upwardly facing stationary support, an intermittently operable conveyor on which a procession of filled containers are successively delivered to and deposited on said stationary support with the top opening of said container facing upwardly, a movable support operable between a lowered position in retracted relation to said stationary support and a raised position in upwardly extending relation to the stationary support, said movable support being operable to lift said container from said stationary support to a cover blank receiving station in upwardly spaced relation to said support when the movable support is operated from lowered position to raised position, a punch and die assembly in spaced overhead relation to the area occupied by the container while in said cover blank receiving station, means for supplying a strip of cover stock having a film of heat activated sealant material on which said punch and die assembly is operable to sever a cover blank from said strip and to present said cover in downwardly facing relation to said container at said cover blank receiving station with said sealant material film facing the punch, and a cover blank transfer member operable to withdraw said severed cover blank from the punch and die assembly and to apply said cover blank to the rim of a container in said cover blank receiving station with the sealant material film facing said rim.

2. A packaging apparatus according to claim 1 wherein said movable support includes a heated collar with which the container at said cover blank receiving station has engagement only along the rim of said container.

3. A packaging apparatus according to claim 1 wherein said cover blank transfer member is reversibly swingable in a fixed path through an arc of 180 degrees.

4. A packaging apparatus according to claim 1 wherein operation of said cover blank transfer member is confined to a fixed path of movement in a guideway having opposed end portions in which said member has vertical straight line movement and an intermediate portion curved on an arc having its chordal limits in vertical alignment with said guideway end portions.

5. A packaging apparatus according to claim 1 wherein said cover blank transfer member has its cover blank engaging surface defined by a pad of silicone rubber.

6. A packaging apparatus according to claim 1 wherein said cover blank transfer member is operable to withdraw said severed blank from the punch and to hold said blank pending its application to the rim of a container at said cover blank receiving station by means of a vacuum system communicating with the cover blank engaging surface of said transfer member.

7. A packaging apparatus according to claim 1 wherein said cover blank transfer member is operable to withdraw said severed blank from the punch and to hold said blank pending its application to the rim of a container at said cover blank receiving station by means of a vacuum system communicating with the cover blank engaging surface of said transfer member and a vacuum system communicating with the cover blank engaging surface of the punch is operable to hold said cover blank pending withdrawal of the cover blank by the transfer member.

8. A packaging apparatus according to claim 1 wherein movement of said strip of cover stock to said punch and die assembly is confined to a fixed line of travel at a horizontal angle of 32 degrees to the direction of travel of the conveyor and said conveyor, stationary support, movable support transfer member and punch and die assembly accommodates movement of said containers in at least two abreast relation and simultaneous application of cover blanks to the rim of said containers while in such plural abreast relation.

9. The method of forming a sealed package wherein a cover is applied to the rim of a filled container, said method including the steps of arranging a series of filled containers in a continuous procession and intermittently conveying said containers to a predetermined station, severing a cover from a strip of cover stock while the cover portion of the strip is in overhead relation to said station, attaching said severed cover to a transfer head while said transfer head is in upwardly facing position opposite said strip of cover stock, thereafter rotating said transfer head so that said head and the cover attached thereto is in downwardly facing position opposite the area occupied by a filled container at said station, lifting said filled container while occupying said station so as to establish contact between the rim of said container and said cover while the cover is attached to said downwardly facing transfer head and the rim of said container and simultaneously applying heat to the rim of the filled container, and releasing said cover from said transfer head while the cover is engaged with the rim of said container.

10. The method according to claim 9 wherein rotation of said transfer head is effected through an arc of 180 degrees and after completion of said rotation and pending arrival of said head in a position wherein contact is made between the cover attached to said head and the rim of the container, said head is moved in a straight line vertical path.

References Cited

UNITED STATES PATENTS

| | | | |
|---|---|---|---|
| 3,112,587 | 12/1963 | Anderson et al. | 53—39 |
| 3,293,823 | 12/1966 | Anderson | 53—307 X |
| 3,408,787 | 11/1968 | Mueller | 53—282 X |

THERON E. CONDON, Primary Examiner

R. L. SPRUILL, Assistant Examiner

U.S. Cl. X.R.

53—41, 298, 307, 329